3,703,415
PRIMARY SODIUM-WATER BATTERY
Stephan P. Mitoff, Elnora, and Fritz G. Will, Scotia, N.Y., assignors to General Electric Company
Filed June 1, 1971, Ser. No. 148,791
Int. Cl. H01m 23/00
U.S. Cl. 136—83 R          5 Claims

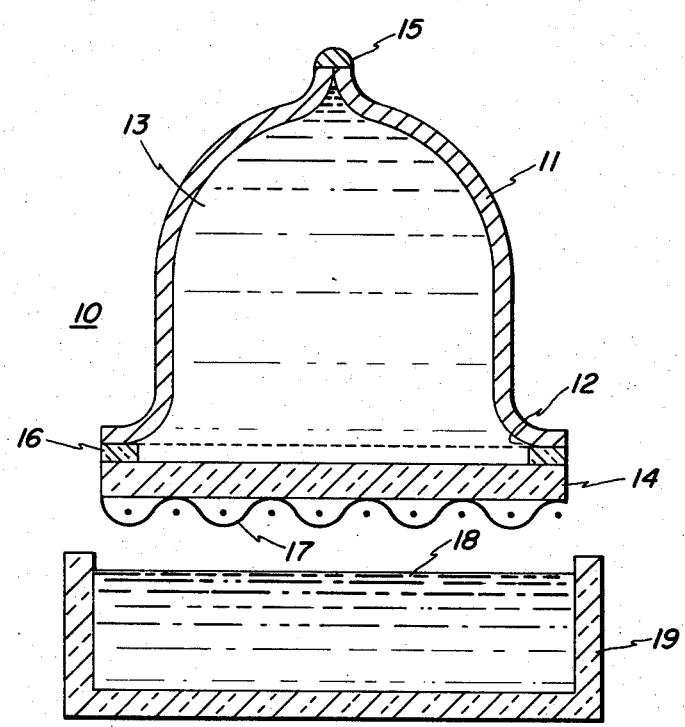

ABSTRACT OF THE DISCLOSURE

A primary sodium-water battery is disclosed which comprises a casing with an open surface, an anode positioned in the casing, an anode of sodium as an amalgam or sodium in a nonaqueous organic electrolyte, a solid sodium ion-conductive electrolyte sealed to the casing closing the open surface, and a metallic grid positioned adjacent the exterior surface of the solid electrolyte.

PRIMARY SODIUM-WATER BATTERY

This invention relates to primary batteries and, more particularly, to such batteries employing an anode of sodium as an amalgam or sodium in an organic electrolyte, and a solid sodium ion-conductive electrolyte.

Sodium-sulfur cells, which operate at elevated temperatures, are known in the prior art as, for example, described in Kummer et al. Patent 3,404,036, issued Oct. 1, 1968, under the title "Energy Conversion Device Comprising a Solid Crystalline Electrolyte and a Solid Reaction Zone Separator." The solid sodium ion-conductive electrolyte in the above-mentioned sodium sulfur battery can be sodium beta-alumina.

Sodium amalgam-oxygen fuel cells are known in the prior art as, for example, described in Eidensohn Patent 3,057,946, issued Oct. 9, 1962, under the title "Fuel Cell System." A sodium amalgam is flowed over the face of a metallic plate within an aqueous solution of sodium hydroxide to provide the anode.

In allowed, copending patent application Ser. No. 811,015, now Pat. No. 3,607,405, filed Mar. 27, 1969, in the name of Harold A. Christopher entitled "Sealed Container for Elemental Sodium," there is described and claimed an evacuated, sealed container. This copending application, which is assigned to the same assignee as the present application, is hereby incorporated by reference into the present application.

Our present invention is directed to a primary sodium-water battery operable at temperatures at 21.5° C. to 100° C.

The primary object of our invention is to provide a low temperature primary battery which has a zero self-discharge rate, high cell voltage and high energy density.

In accordance with one aspect of our invention, a primary sodium-water battery comprises a casing with an open end, an anode positioned in the casing, the anode selected from the class consisting of sodium as an amalgam and sodium in a nonaqueous organic electrolyte, a solid sodium ion-conductive electrolyte sealed to the casing closing the open surface, and a metallic grid positioned in physical contact with the exterior surface of the solid electrolyte.

These and various other objects, features and advantages of the invention will be better understood from the following description taken in connection with the accompanying drawing in which:

The single figure is a sectional view of a battery made in accordance with our invention.

In the single figure of the drawing, there is shown generally at 10 a primary sodium-water battery embodying our invention which has a metallic casing 11 with an initial open end 12. An anode 13 of sodium as an amalgam is shown positioned within casing 11. A solid sodium ion-conductive electrolyte 14 is sealed to casing 11 thereby closing open end 12. An electrical lead (not shown) is affixed to the casing. A closed fill tube 15 is associated with the opposite end of casing 11. Solid electrolyte 14 is secured to casing 11 by a glass seal 16. A metallic grid 17 is positioned in physical contact with the exterior surface of electrolyte 14.

The exterior surface of electrolyte 14 and metallic grid 17 are contacted by an aqueous solution 18, such as fresh water, sea water, sodium hydroxide solution, etc. shown in a container 19 for operation of the battery. During operation, the reaction at the metallic screen consists in the evolution of hydrogen. Simultaneously, water is consumed and sodium hydroxide is formed.

We found that we could form a primary sodium-water battery by providing a metallic casing with an open end, providing an anode within the casing, the anode selected from the class consisting of sodium as an amalgam and sodium in a nonaqueous organic solvent, providing a solid sodium ion-conductive electrolyte sealed to the casing closing the open end, and positioning a metallic grid in physical contact with the exterior surface of the solid electrolyte.

We found that the above batteries have an open circuit voltage of 2.65 volts and energy density of 380 watt hours per pound (wh./lb.). Power densities of up to 20 milliwatts per square centimeter (mw./cm.$^2$) can be attained.

We found that other configurations of the battery were useful. For example, a casing of a solid sodium ion-conductive electrolyte material with an anode of sodium as an amalgam or sodium in a nonaqueous organic electrolyte therein, which casing is described in the above copending application Ser. No. 811,015, can be employed in our primary sodium-water battery. A metallic grid is positioned in physical contact with the exterior surface of the casing, and water or sodium hydroxide solution is placed in contact with both the metallic grid and the exterior surface of at least a portion of the casing.

The metallic grid can be formed of various metals and employed in various configurations. Nickel is preferred as the metal for the grid while it can be in the form of a screen, punched metal, expanded metal, etc. We found that the anode casing should preferably be nickel or Kovar alloy. These metals have been shown to be chemically stable in their respective environments. The preferred nonaqueous electrolyte is a sodium salt dissolved in propylene carbonate. The battery can be operated over a range of temperatures from 21.5° C. to 100° C.

A method of hermetically sealing the solid electrolyte to the open surface of the casing comprises providing a disc of solid sodium ion-conductive electrolyte, for example, sodium beta-alumina, upon which is stacked a ring of General Electric Company 1013 glass cut from tubing. The glass ring has approximately the inside and outside diameter of the cup lip of casing portion. On the glass ring is stacked the nickel casing with its lip adjacent the ring. The three components are positioned on a supporting jig and lowered into an inert atmosphere furnace at 1000° C. for about one minute. The resulting seal is helium leak-tight.

We found the casing can be filled with sodium as an amalgam or sodium in a nonaqueous organic solvent through tube 15 after which the tube is sealed, as for example, by welding. The resulting device is a primary sodium water battery. Leads (not shown) are attached to the casing portion and to the nickel grid for operation of the battery. The battery is discharged by applying a load across the anode and cathode leads after the metallic grid and exterior surface of the electrolyte are contacted by an aqueous solution.

Examples of primary sodium-water batteries made in accordance with our invention are set forth below:

EXAMPLE 1

A battery was assembled generally in accordance with the above description and with the single figure of the drawing wherein a metallic nickel casing was provided. The casing was in the form of a cup with a lip and a tube extending from the closed surface. A solid sodium ion-conductive electrolyte was provided in the form of a disc of sodium beta-alumina. A glass ring with approximately the inside and outside diameter of the cup lip was cut from General Electric Company 1013 glass tubing. The electrolyte disc, glass ring and lip of the anode portion were stacked together on a jig which was lowered into a furnace at 1000° C. for about 1 minute. The resulting seal was tested and found to be helium leak-tight. A nickel screen was attached to the exterior surface of the solid electrolyte whereby the screen was positioned adjacent the exterior surface.

The casing was then filled through its fill tube with sodium as an amalgam which consisted of 40% sodium and 60% mercury. The end of the fill tube was then sealed by welding. The resulting device was a primary sodium-water battery.

EXAMPLE 2

The battery of Example 1 was tested by contacting the metallic grid and the exterior surface of the solid electrolyte with an aqueous solution of 5% sodium hydroxide. A platinum reference electrode was also immersed in the aqueous solution. Reference voltages were measured between the anode and the platinum reference electrode, while working voltage was measured between the anode and the screen. The measurements are set forth below in Table I.

TABLE I

| Current, milliamperes | Reference voltage, volts | Working voltage, volts |
|---|---|---|
| 0 | 2.65 | 2.65 |
| 0.24 | 2.55 | 2.25 |
| 0.41 | 2.48 | 2.06 |
| 0.8 | 2.35 | 1.62 |
| 1.37 | 2.26 | 1.51 |
| 2.80 | 2.10 | 1.35 |
| 5.40 | 1.86 | 1.12 |
| 8.4 | 1.67 | .94 |
| 12.0 | 1.48 | .74 |
| 21.0 | 1.05 | .25 |
| 25.0 | 0.88 | .04 |

While other modifications of the invention and variations thereof which may be employed within the scope of the invention have not been described, the invention is intended to include such as may be embraced within the following claims.

What we claim as new and desire to secure by Letters Patent of the United States is:

1. A primary sodium-water battery comprising a casing with an open end, an anode positioned in the casing, the anode selected from the class consisting of sodium as an amalgam and sodium in a nonaqueous organic solvent, a solid sodium ion-conductive electrolyte sealed to the casing closing the open end, a metallic grid positioned in physical contact with the exterior surface of the solid electrolyte, and an aqueous solution in contact with the metallic grid and the exterior surface of the solid electrolyte.

2. In a primary sodium-water battery as in claim 1, in which the electrolyte is a sodium salt dissolved in propylene carbonate.

3. In a primary sodium-water battery as in claim 1, in which the metallic grid is a nickel screen.

4. A primary sodium-water battery comprising a casing of a solid crystalline ion-conductive electrolyte material, an anode positioned in the casing, the anode selected from the class consisting of sodium as an amalgam and sodium in a nonaqueous organic electrolyte, a metallic grid positioned in physical contact with the exterior of the casing, and an aqueous solution in contact with the metallic grid and the electrolyte casing.

5. In a primary sodium-water battery as in claim 4, in which the electrolyte is a sodium salt dissolved in propylene carbonate.

References Cited

UNITED STATES PATENTS

| | | | |
|---|---|---|---|
| 3,057,946 | 10/1962 | Eidensohn | 136—86 A |
| 3,404,035 | 10/1968 | Kummer et al. | 136—6 |
| 3,404,036 | 10/1968 | Kummer et al. | 136—6 |
| 3,579,382 | 5/1971 | Christopher | 136—20 |
| 3,607,405 | 9/1971 | Christopher | 136—20 |

ANTHONY SKAPARS, Primary Examiner